United States Patent [19]

Alger

[11] 4,137,977
[45] Feb. 6, 1979

[54] HYDRAULIC WEIGHING SYSTEM
[75] Inventor: Richard N. Alger, Moulton, Ala.
[73] Assignee: Champion International Corporation, Stamford, Conn.
[21] Appl. No.: 875,373
[22] Filed: Feb. 6, 1978
[51] Int. Cl.² .................. G01G 19/02; G01G 5/04
[52] U.S. Cl. .................... 177/146; 177/254
[58] Field of Search ............ 177/52, 145, 146, 254

[56]  References Cited
U.S. PATENT DOCUMENTS

| | | | |
|---|---|---|---|
| 4,056,156 | 11/1977 | Dayton | 177/254 X |
| 4,062,415 | 12/1977 | Miller | 177/254 X |
| 4,079,797 | 3/1978 | Bishop et al. | 177/145 |

FOREIGN PATENT DOCUMENTS 1051021  9/1953  Fed. Rep. of Germany ........... 177/146

Primary Examiner—George H. Miller, Jr.
Attorney, Agent, or Firm—Evelyn M. Sommer

[57] ABSTRACT

A system for weighing spools of paper includes a pair of hydraulic cylinders with pistons which may be extended to support the ends of the reel upon which the paper spool is wound. One fluid inlet of each of the cylinders is connected to a fluid reserve tank. The other fluid inlet communicates with an air-hydraulic booster through a hydraulic fluid line. A four-way, two-position valve includes an inlet from a high pressure air supply, an exhaust outlet, and air lines connected to the fluid reserve tanks and to the air-hydraulic booster. Load cells positioned on each of the pistons are connected to a scale device which provides a visual weight display. When a spool of paper is to be weighed, the valve directs high pressure air to the air-hydraulic booster to extend the pistons. The force exerted by the spool on the load cells is equal to the weight of the spool.

15 Claims, 4 Drawing Figures

HYDRAULIC WEIGHING SYSTEM

BACKGROUND OF THE INVENTION

The present invention relates to weight-measuring devices and more particularly to an air-driven hydraulic weighing system.

Spools of paper are weighed as one step of the paper-manufacturing process. Different types of scales are employed to perform this weighing step. Some of these scales are completely mechanical in nature. Others employ hydraulic systems using electric motors to pump the hydraulic fluid. Others require that the spools of paper be removed from the processing line in order to be weighed.

The known systems have known drawbacks. Mechanical scales require continuous maintenance because of the number of moving parts which such scales include. Because any mechanical scale is subject to wear, it must also be recalibrated periodically by taking the scale out of service and using it to weigh a reference load.

Hydraulic systems having electrically-powered fluid pumps also require a relatively high level of maintenance as well as periodic recalibration.

Of course, if the scale is of a type which requires that the paper to be weighed be diverted from the processing line, the manufacturing process is necessarily slowed by the weighing step.

SUMMARY OF THE INVENTION

The present invention is a hydraulic weighing system with relatively few moving parts which is capable of weighing spools of paper or other objects without diverting those objects from a processing line. The system may be self-checking or self-calibrating in one embodiment.

The hydraulic weighing system includes at least one hydraulic cylinder having a piston which can be extended to support an object being weighed. At least one fluid reserve tank is connected to a fluid inlet of the hydraulic cylinder. An air-hydraulic booster has a hydraulic fluid line communicating with the other fluid inlet of the cylinder. The air-hydraulic booster also has a first air line through which high pressure air may be introduced to increase the pressure in the hydraulic fluid line and a second air line through which high pressure air may be introduced to relieve pressure in the hydraulic fluid line. A valve is connected to the fluid reserve tank and to the air lines. When an object is to be weighed, the valve causes high pressure air to be applied through the first air line, increasing pressure in the hydraulic fluid line and extending the piston to an object-supporting position. Means are provided for monitoring the force exerted on the piston by the object being supported. At the conclusion of the weighing operation, the valve can direct high pressure air to the second air line to allow the piston to be retracted to a non-supporting position.

DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

DETAILED DESCRIPTION

Figure 1:
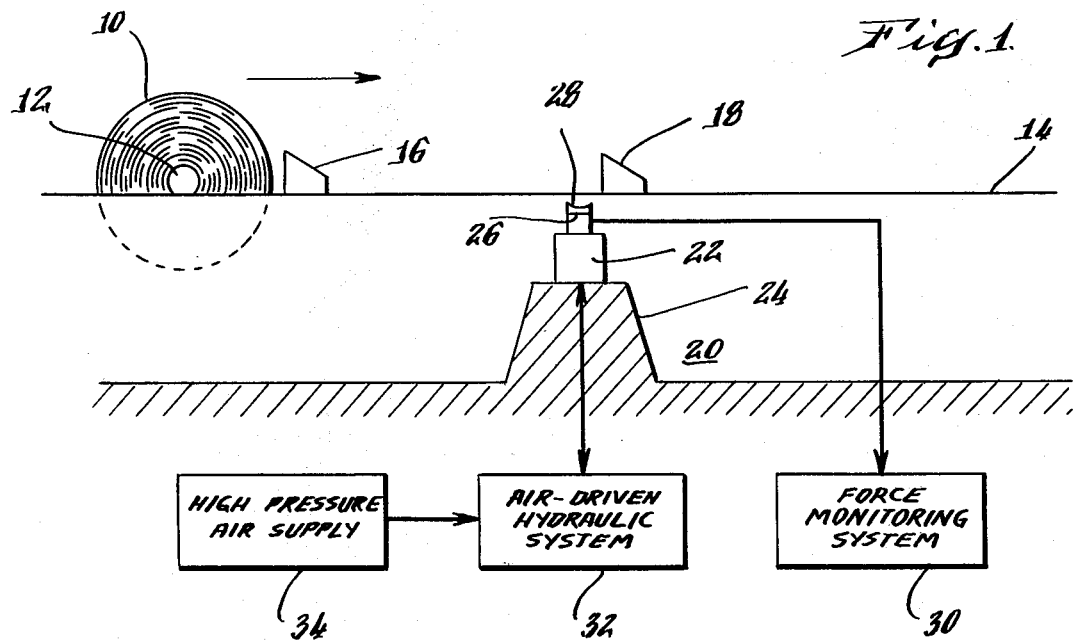
FIG. 1 is a partially schematic side view of the major subsystems of a hydraulic weighing system constructed in accordance with the present invention.

Referring to FIG. 1, a spool 10 of paper wound on a reel 12 is shown being rolled along parallel rails, only one rail 14 of which can be seen. The parallel rails would extend away from a conventional paper making machine for a preferred use of the invention. A gating mechanism including a first retractable stop element 16 and a second retractable stop element 18 is located on the path of travel defined by the rails. A hydraulic weighing system indicated generally at 20 includes a hydraulic cylinder 22 mounted on an abutment 24 between the stop elements 16 and 18. The hydraulic cylinder 22 includes a retractable piston 26 which, in a preferred embodiment, carries a force-responsive device such as a load cell 28. Load cell 28 provides an output signal to a force monitoring system 30 which may take the form of a scale mechanism for providing a visual indication of weight.

Hydraulic cylinder 22 operates under the control of an air-driven hydraulic system 32 to which high pressure air from a source 34 may be applied.

While only those components which are adjacent rail 14 are shown in FIG. 1, it should be understood that another hydraulic cylinder and load cell are positioned opposite the second, spaced rail. As will be discussed below, both cylinders are controlled by the single air-driven hydraulic system.

As a spool 10 of paper is rolled toward the weighing station along rail 14 and its companion rail, stop element 16 is momentarily retracted to allow the spool to enter the weighing station. The stop element 16 is then extended to prevent subsequent rolls from interfering with the weighing of the roll which has entered the station. When the roll is positioned above the hydraulic cylinder 22 and its companion cylinder adjacent the opposite rail, the pistons are extended under the control of the air-driven hydraulic system 32 to lift the spool 10 from the parallel rails. With the spool 10 resting solely on the pistons (and the load cells) the downward force exerted by the spool is equal to the weight of the paper plus the weight of the reel 12. Signals generated by the load cells are applied to the force monitoring system 30, which may include a fixed offset for deducting the known weight of the reel 12 to provide a signal representing the net weight of the paper.

When the weighing operation is complete, the air-driven hydraulic system 32 causes piston 26 and its companion piston to be retracted, bringing the reel 12 to rest on the spaced, parallel rails. Stop element 18 is retracted to allow spool 10 to be rolled to the right for further processing.

Figure 2:
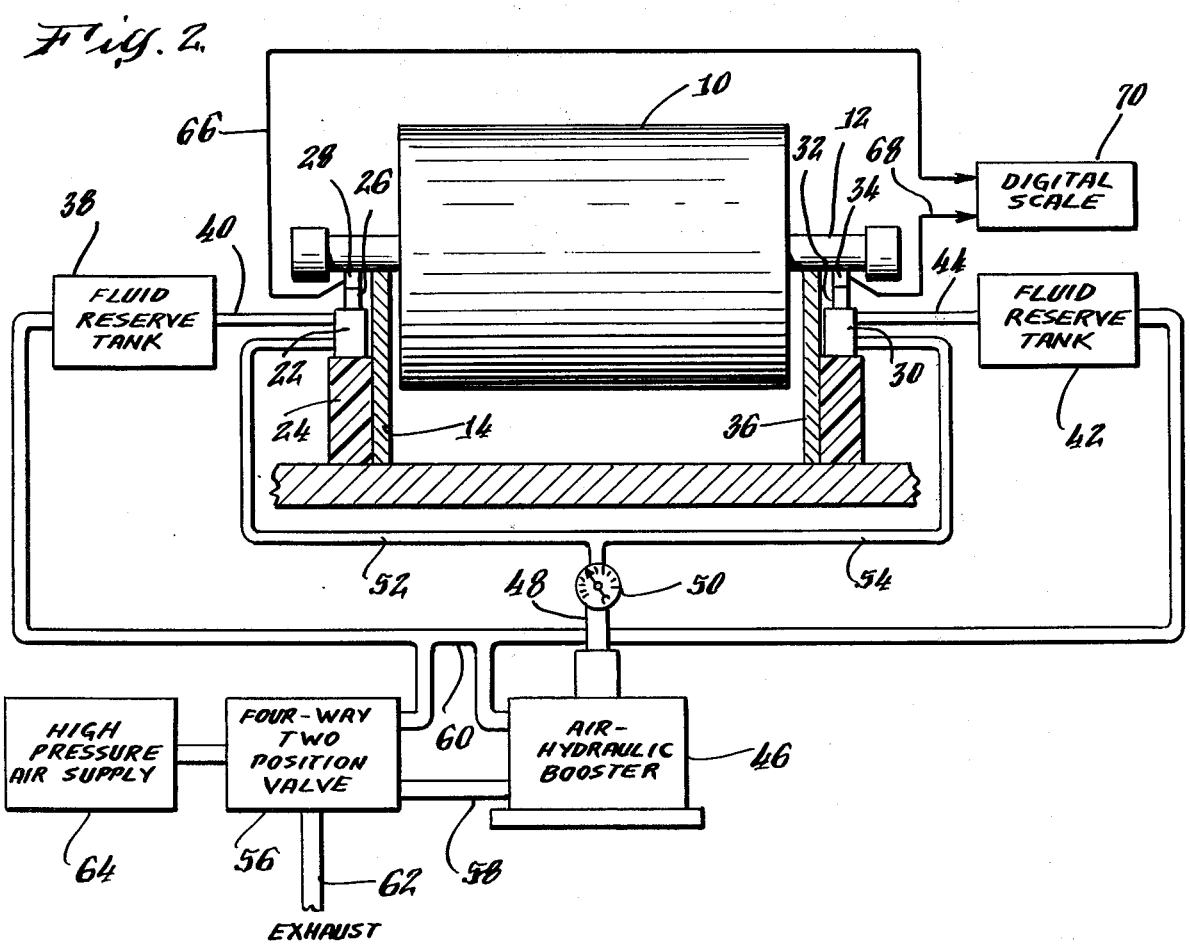
FIG. 2 is a partially schematic front view showing the components of the hydraulic weighing system in greater detail.

FIG. 2 shows that the physical and hydraulic components of the system are basically symmetrical about the center line of the spool 10. That is, a hydraulic cylinder 30 having a piston 32 capped by a load cell 34 is located adjacent a rail 36 where it operates in synchronism with cylinder 22 adjacent the rail 14.

The air-driven hydraulic system 32 includes a fluid reserve tank 38 having a fluid line 40 which is connected to one fluid inlet for the cylinder 22. A similar fluid reserve tank 42 has a hydraulic fluid line 44 communicating with the corresponding fluid inlet of hydraulic cylinder 30.

The system 32 further includes an air-hydraulic booster unit 46 having a single hydraulic fluid outlet line 48 through a pressure gauge 50. The outlet line 48 branches at a tee 50 to provide hydraulic fluid lines 52 and 54 communicating with second fluid inlets of the cylinders 22 and 30, respectively. The air-hydraulic booster unit 46 is connected to a four-way, two-position valve 56 through a first air line 58 and through a second air line 60. Branches of the second air line 60 are also connected to the fluid reserve tanks 38 and 42. Valve 56, which includes an exhaust connection 62, may be supplied with air provided by a high pressure air supply 64.

The load cells 28 and 32 are, in a preferred embodiment of the invention, connected through electrical leads 66 and 68, respectively, to a digital scale 70 which provides a visual display of the weight of spool 10.

When a weighing operation starts, both piston 26 and piston 32 are fully retracted and the entire weight of spool 10 rests on the rails 14 and 36. The pistons 26 and 32 are extended by applying high pressure air through air line 58 to increase the hydraulic pressure in the hydraulic fluid lines 48, 52 and 54 until the entire weight of the spool 10 rests on the load cells 28 and 34 which cap the pistons. To assure valid force readings, the system should be designed so that the amount of fluid available to the cylinders 22 and 30 will be great enough to allow the pistons 26 and 32 to extend so as to support the spool 10 but not so great that the pistons 26 and 32 will ever be driven to their extended limit positions. If the system is designed in this manner, the hydraulic pressure detected by the fluid pressure gauge 50 in the outlet line 48 will be a function solely of the weight of the spool 10, without distortions which might otherwise be introduced if the pistons could be driven into limit positions in which they would be working against not only the weight of spool 10 but also against mechanical interlocks for limiting piston travel.

The system described above has self-checking or self-calibrating capabilities. Since the downward force exerted by the spool 10 on the pistons 26 and 32 must be counterbalanced by the upward forces exerted by those pistons and since the hydraulic pressure in the outlet line 48 can be easily monitored, the spool weight can be calculated as the hydraulic pressure in line 48 multiplied by the combined areas of the surfaces within cylinders 22 and 30 against which that fluid works. For example, if the hydraulic fluid pressure detected by gauge 50 is on the order of 1600 pounds per square inch and the surface area against which that fluid works is on the order of 3.0 square inches, the total upward force can be calculated as 1600 lbs/in.$^2$ × 3in.$^2$ or 4800 lbs. This upward force is, of course, counterbalanced by an equal downward force when the system is in equilibrium. Thus, the weight of the spool 10 and reel 12 together could be determined by the use of pressure gauge 50 alone as 4800 pounds.

While it might be possible to eliminate the load cells and digital scale altogether and to rely on the pressure gauge 50 to provide signals which could be converted to weight information, the pressure gauge 50 is used only to monitor proper operation of the load cells 28 and 34 or as a backup system in the preferred embodiment of the invention.

Figure 3:
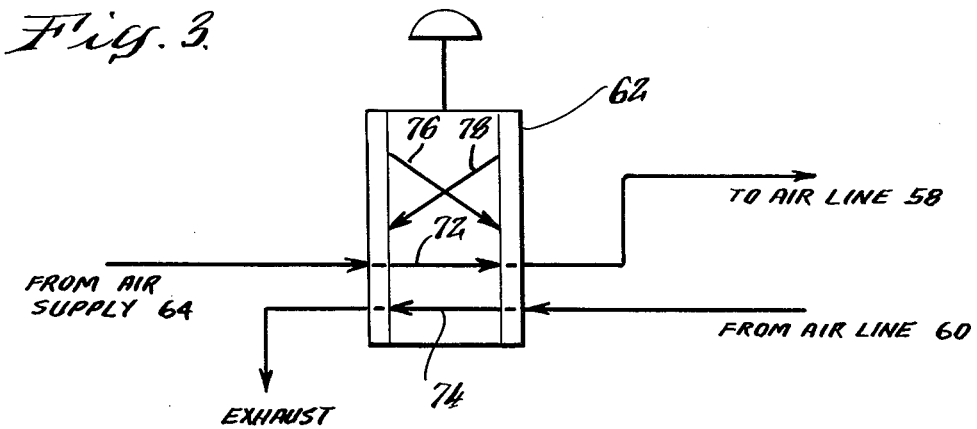
FIG. 3 is a schematic representation of the fourway two-position valve employed in a preferred embodiment of the invention in its "extend" mode.

The four-way, two-position valve which is used to control the flow of high pressure and exhaust air is a known component. FIG. 3 is a schematic representation of the air flow paths through the valve as they exist when the pistons are being extended from the cylinders. High pressure air provided from supply 64 is directed through a straight internal connection 72 to the air line 58 leading to the air-hydraulic booster 46. Air from the air line 60 is exhausted through a second straight line connection 74. Cross-over connections 76 and 78 are blocked when the valve is operated in this mode.

Figure 4:
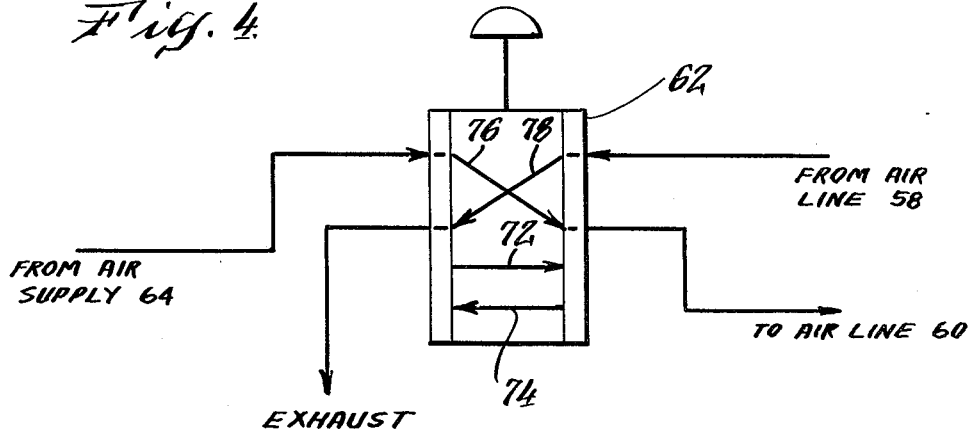
FIG. 4 is a schematic representation of the valve in its "retract" mode.

FIG. 4 shows the valve in its second position. In this position, the straight connections 72 and 74 are blocked while connection 76 directs high pressure air from supply 64 to the air line 60. Air contained in air line 58 is exhausted from the valve through cross-over connection 78.

The system described above is an extremely simple one. The only moving parts are the pistons 26 and 32 and parts within the valve 62 and air-hydraulic booster 46. All moving parts have a simple reciprocal motion. Because of the simplicity of the design and the absence of complex driving mechanisms, such as electrically-powered hydraulic pumps, the maintenance requirements for the system are low. Moreover, the system is a self-checking one for the described embodiment since the pressure reading of gauge 50 can be translated to reel weight to provide a check on the calibration of the load cells 28 and 34. Moreover, the weighing system is incorporated into the paper processing line to eliminate the need to remove the spools from the processing line in order to weigh them.

While there has been described what is considered to be a preferred embodiment of the invention, variations and modifications therein will occur to those skilled in the art when they become acquainted with the basic concepts of the invention. Therefore, it is intended that the appended claims shall be construed to include all such variations and modifications as fall within the true spirit and scope of the invention.

What is claimed is:

1. For use in weighing objects, a hydraulic weighing station comprising:

at least one hydraulic cylinder having a hydraulic piston which may be extended to support an object being weighed;

at least one fluid reserve tank having a fluid connection to one fluid inlet in each said hydraulic cylinder;

an air-hydraulic booster having a hydraulic fluid line communicating with a second fluid inlet to each of said cylinders, a first air line through which high pressure air may be applied to increase the pressure in said hydraulic fluid line, and a second air line through which high pressure air may be applied to relieve the pressure in said hydraulic fluid line;

valve means connected to each said fluid reserve tank, to said first air line and to said second air line, said valve means being adapted to direct high pressure air through said first air line when each of said pistons is to be extended to support an object being weighed or to said second air line when each of said pistons is to be retracted to a non-supporting position; and means for monitoring the force exerted on each of said pistons by the object supported by said pistons when in their extended position.

2. A hydraulic weighing station as recited in claim 1 wherein said monitoring means comprises at least one load cell interposed between each of said pistons and the object being weighed.

3. A hydraulic weighing station as recited in claim 1 wherein said monitoring means comprises a fluid pressure gauge for measuring the fluid pressure in said hydraulic fluid line connecting said air-hydraulic booster to each of said hydraulic cylinders.

4. A hydraulic weighing station as recited in claim 2 further including a scale electrically connected to each of said load cells and having means for converting load cell signals to a weight-indicating visual display.

5. A hydraulic weighing station as recited in claim 4 wherein said valve means comprises a four-way, two-position valve.

6. For use in weighing objects being transported along a predetermined path, a hydraulic weighing station comprising:
at least one hydraulic cylinder located on the predetermined path and having a piston which may be extended to support an object moved into position above said cylinder;
at least one fluid reserve tank connected to a fluid inlet to each of said cylinders;
an air-hydraulic booster having a hydraulic fluid line communicating with a second fluid inlet to each of said cylinders, a first air line through which high pressure air may be applied to increase the pressure in said hydraulic fluid line and a second air line through which high pressure air may be applied to relieve the pressure in said hydraulic fluid line;
valve means connected to each said fluid reserve tank, to said first air line and to said second air line, said valve means being adapted to direct high pressure air through said first air line when each of said pistons is to be extended to support an object moved into position above each of said cylinders or to direct high pressure air to each of said fluid reserve tanks and through the second air line to said air-hydraulic booster when each of said pistons is to be retracted to permit the object to be moved along the predetermined path; and
means for monitoring the force exerted on each of said pistons by an object supported by the extended pistons.

7. A hydraulic weighing station as recited in claim 6 wherein said monitoring means comprises at least one load cell interposed between each of said pistons and the object being weighed.

8. A hydraulic weighing station as recited in claim 6 wherein said monitoring means comprises a fluid pressure gauge for measuring the fluid pressure in said hydraulic fluid line connecting said air-hydraulic booster to each of said hydraulic cylinders.

9. A hydraulic weighing station as recited in claim 7 further including a scale electrically connected to each of said load cells and having means for converting load cell signals to a weight-indicating visual display.

10. A hydraulic weighing station as recited in claim 9 wherein said valve means comprises a four-way, two-position valve.

11. For use in weighing rolls of paper or other sheet materials wound on reels which extend beyond the edges of the wound materials wherein the rolls are transported by rolling the reels along spaced, parallel rails, a hydraulic weighing station comprising:
gating means for positioning each reel at a predetermined position along said parallel rails;
first and second hydraulic cylinders at the predetermined position, each of said cylinders having a hydraulic piston which may be extended to support one end of a reel or retracted to permit said reel to be moved along said parallel rails;
at least one fluid reserve tank connected to a fluid inlet to each of said first and said second hydraulic cylinders;
an air-hydraulic booster having a hydraulic fluid line communicating with a second fluid inlet to each of said cylinders, a first air line through which high pressure air may be applied to increase the pressure in said hydraulic fluid line and a second air line through which high pressure air may be applied to relieve the pressure in said hydraulic fluid line;
valve means connected to each said fluid reserve tank, to said first air line and to said second air line, said valve means being adapted to direct high pressure air through said first air line when said pistons are to be extended to support opposite ends of a reel or to direct high pressure air to each fluid reserve tank and through said second air line when said pistons are to be retracted to a non-supporting position; and
means for monitoring the force exerted on each of said pistons by the supported reel.

12. A hydraulic weighing station as recited in claim 11 wherein said monitoring means comprises first and second load cells interposed between the ends of said pistons and the reel supported by said pistons.

13. A hydraulic weighing station as recited in claim 11 wherein said monitoring means comprises a fluid pressure gauge for measuring the fluid pressure in said hydraulic fluid line connecting said air-hydraulic booster to said first and second hydraulic cylinders.

14. A hydraulic weighing station as recited in claim 12 further including a scale electrically connected to said first and second load cells and having means for converting load cell signals to a weight-indicating output display.

15. A hydraulic weighing system as recited in claim 14 wherein said valve means comprises a four-way, two-position valve.

* * * * *